United States Patent
Takiguchi et al.

(10) Patent No.: US 10,987,772 B2
(45) Date of Patent: Apr. 27, 2021

(54) MACHINE TOOL AND MACHINE TOOL MANAGEMENT DEVICE WITH TOOL STATE DISPLAY

(71) Applicant: DMG MORI CO., LTD., Yamatokoriyama (JP)

(72) Inventors: Yoshihiro Takiguchi, Yamatokoriyama (JP); Akio Sanada, Sapporo (JP); Koji Matsuoka, Yamatokoriyama (JP); Tetsushi Asada, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 50 days.

(21) Appl. No.: 16/058,318

(22) Filed: Aug. 8, 2018

(65) Prior Publication Data

US 2019/0047101 A1   Feb. 14, 2019

(30) Foreign Application Priority Data

Aug. 8, 2017  (JP) .................. 2017-153581

(51) Int. Cl.
   *B23Q 3/157*      (2006.01)
   *G05B 19/409*     (2006.01)
   *G05B 19/4093*    (2006.01)

(52) U.S. Cl.
   CPC .......... *B23Q 3/157* (2013.01); *G05B 19/409* (2013.01); *G05B 19/40938* (2013.01); *G05B 2219/35513* (2013.01); *G05B 2219/36302* (2013.01)

(58) Field of Classification Search
   CPC .............................. G05B 19/409; B23Q 3/157
   See application file for complete search history.

(56) References Cited

U.S. PATENT DOCUMENTS

| | | | |
|---|---|---|---|
| 10,423,147 B2 * | 9/2019 | Kawai | G05B 19/4093 |
| 2002/0117021 A1 * | 8/2002 | Nakahira | G05B 19/404 |
| | | | 74/813 R |

(Continued)

FOREIGN PATENT DOCUMENTS

| EP | 2913147 A1 | 9/2015 |
|---|---|---|
| EP | 3040156 A  | 7/2016 |

(Continued)

OTHER PUBLICATIONS

An extended European Search Report dated Feb. 13, 2019 of European Patent Application No. 18185859.8. [The issue date of this search report is more than 3 months of the filing of this IDS and therefore the fee set forth in 37 CFR 1.17 (p) has been submitted herewith.].

(Continued)

*Primary Examiner* — Bernard G Lindsay
(74) *Attorney, Agent, or Firm* — Muncy, Geissler, Olds & Lowe, P.C.

(57) ABSTRACT

A tool management device for managing tools detachable from a plurality of tool stations provided in a turret of a machine tool includes a display controller controlling a display to display tool information related to one or more tools attached to each of the plurality of tool stations. The display controller switches, on a single screen, between a deployed state of deploying and displaying tool information related to all tools attached to one of the plurality of tool stations, and a folded state of folding and displaying tool information related to only one predetermined tool among the all tools attached to the one of the plurality of tool stations.

7 Claims, 9 Drawing Sheets

(56) References Cited

U.S. PATENT DOCUMENTS

| | | | |
|---|---|---|---|
| 2007/0124016 A1* | 5/2007 | Senda | B23Q 3/15546 700/180 |
| 2007/0163414 A1* | 7/2007 | Senda | B21D 37/145 83/684 |
| 2008/0033592 A1* | 2/2008 | Okrongli | G05B 19/4083 700/179 |
| 2011/0098165 A1* | 4/2011 | Tomioka | B23B 31/1071 483/58 |
| 2015/0025672 A1* | 1/2015 | Hemmanur | G05B 19/40938 700/160 |
| 2016/0187871 A1* | 6/2016 | Yi | B23Q 1/0045 700/173 |
| 2016/0320772 A1* | 11/2016 | Ono | G05B 19/40938 |
| 2016/0320889 A1* | 11/2016 | Jenkinson | G06F 11/2221 |
| 2017/0001279 A1* | 1/2017 | Ando | B23Q 17/0961 |
| 2017/0031345 A1* | 2/2017 | Ono | G05B 19/409 |
| 2017/0176980 A1* | 6/2017 | Nishioka | B23Q 3/15713 |
| 2017/0220025 A1* | 8/2017 | Kawai | G05B 19/409 |
| 2018/0285395 A1* | 10/2018 | Luo | G05B 19/4183 |

FOREIGN PATENT DOCUMENTS

| | | | |
|---|---|---|---|
| JP | 3207125 B2 | 9/2001 | |
| JP | 2007-75961 A | 3/2007 | |
| JP | 2008-87094 A | 4/2008 | |
| WO | 2016051543 A1 | 4/2016 | |

OTHER PUBLICATIONS

An Office Action dated Feb. 4, 2020 of Japanese Patent Application No. 2017-153581 and an English translation thereof.

\* cited by examiner

[Fig. 1]
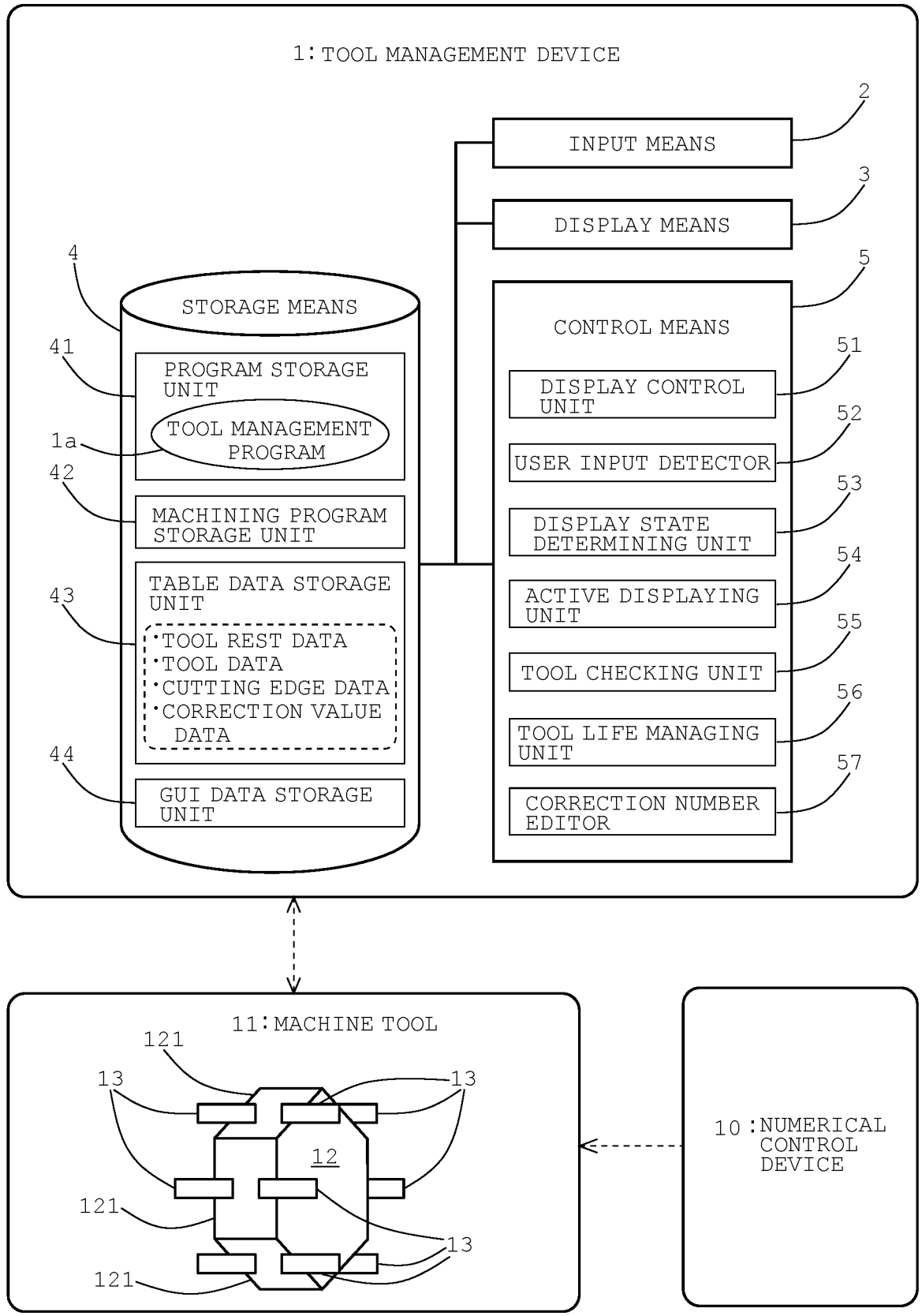

[FIG. 2]

TOOL REST DATA

| STATION NUMBER | ATTACHED POSITION NUMBER | ATTACHED POSITION VALID FLAG | TOOL MANAGEMENT NUMBER |
|---|---|---|---|
| 1 | 1 | ON | 1 |
|   | 2 | ON | 2 |
|   | ⟨ | ⟨ | ⟨ |
|   | … | … | … |

| STATION NUMBER | ATTACHED POSITION NUMBER | ATTACHED POSITION VALID FLAG | TOOL MANAGEMENT NUMBER |
|---|---|---|---|
| 2 | 1 | ON | 3 |
|   | 2 | ON | 4 |
|   | ⟨ | ⟨ | ⟨ |
|   | … | … | … |

| STATION NUMBER | ATTACHED POSITION NUMBER | ATTACHED POSITION VALID FLAG | TOOL MANAGEMENT NUMBER |
|---|---|---|---|
| 3 | 1 | ON | 5 |
|   | 2 | ON | 6 |
|   | ⟨ | ⟨ | ⟨ |
|   | … | … | … |

| STATION NUMBER | ATTACHED POSITION NUMBER | ATTACHED POSITION VALID FLAG | TOOL MANAGEMENT NUMBER |
|---|---|---|---|
| 4 | 1 | ON | 7 |
|   | 2 | ON | 8 |
|   | ⟨ | ⟨ | ⟨ |
|   | … | … | … |

⟨

| STATION NUMBER | ATTACHED POSITION NUMBER | ATTACHED POSITION VALID FLAG | TOOL MANAGEMENT NUMBER |
|---|---|---|---|
| … | 1 | OFF | … |
|   | 2 | OFF | … |
|   | ⟨ | ⟨ | ⟨ |
|   | … | … | … |

[FIG. 3]

TOOL DATA

| TOOL MANAGEMENT NUMBER | GROUP NUMBER | CURRENT LIFE VALUE | LIFE SETTING VALUE | STATUS |
|---|---|---|---|---|
| 1 | 1 | 999 | 999999 | NORMAL |
| 2 | 17 | 999 | 999999 | NORMAL |
| 3 | 2 | 999 | 999999 | NORMAL |
| 4 | 18 | 999 | 999999 | NORMAL |
| 5 | 3 | 999 | 999999 | NORMAL |
| 6 | 19 | 999 | 999999 | NORMAL |
| 7 | 4 | 999 | 999999 | NORMAL |
| 8 | 20 | 999 | 999999 | NORMAL |
| 9 | 6 | 999 | 999999 | NORMAL |
| 10 | 22 | 999 | 999999 | NORMAL |
| ⋮ | ⋮ | ⋮ | ⋮ | ⋮ |
| ... | ... | ... | ... | ... |

[FIG. 4]

CUTTING EDGE DATA

| TOOL MANAGEMENT NUMBER | CUTTING EDGE NUMBER | CORRECTION NUMBER | T-CODE |
|---|---|---|---|
| 1 | 1 | 1 | 0101 |
| | 2 | 2 | 0102 |
| | ≀ | ≀ | ≀ |
| | ... | ... | ... |

| TOOL MANAGEMENT NUMBER | CUTTING EDGE NUMBER | CORRECTION NUMBER | T-CODE |
|---|---|---|---|
| 2 | 1 | 17 | 0117 |
| | 2 | 0 | 0 |
| | ≀ | ≀ | ≀ |
| | ... | ... | ... |

| TOOL MANAGEMENT NUMBER | CUTTING EDGE NUMBER | CORRECTION NUMBER | T-CODE |
|---|---|---|---|
| 3 | 1 | 2 | 0202 |
| | 2 | 0 | 0 |
| | ≀ | ≀ | ≀ |
| | ... | ... | ... |

≀

| TOOL MANAGEMENT NUMBER | CUTTING EDGE NUMBER | CORRECTION NUMBER | T-CODE |
|---|---|---|---|
| ... | 1 | 2 | 0202 |
| | 2 | 0 | 0 |
| | ≀ | ≀ | ≀ |
| | ... | ... | ... |

[FIG. 5]

CORRECTION VALUE DATA

| CORRECTION NUMBER | CORRECTION VALUE (OFFSET VALUE) | |
|---|---|---|
| | AMOUNT OF CORRECTION FOR SHAPE | AMOUNT OF CORRECTION FOR ABRASION |
| 1 | X:-240mm, Z:-450mm | X:-0.06mm, Z: 0.03mm |
| 2 | ... | ... |
| 3 | ... | ... |
| 4 | ... | ... |
| 5 | ... | ... |
| 6 | ... | ... |
| 7 | ... | ... |
| 8 | ... | ... |
| 9 | ... | ... |
| 10 | ... | ... |
| ⁓ | ⁓ | ⁓ |
| ... | ... | ... |

[FIG. 6]
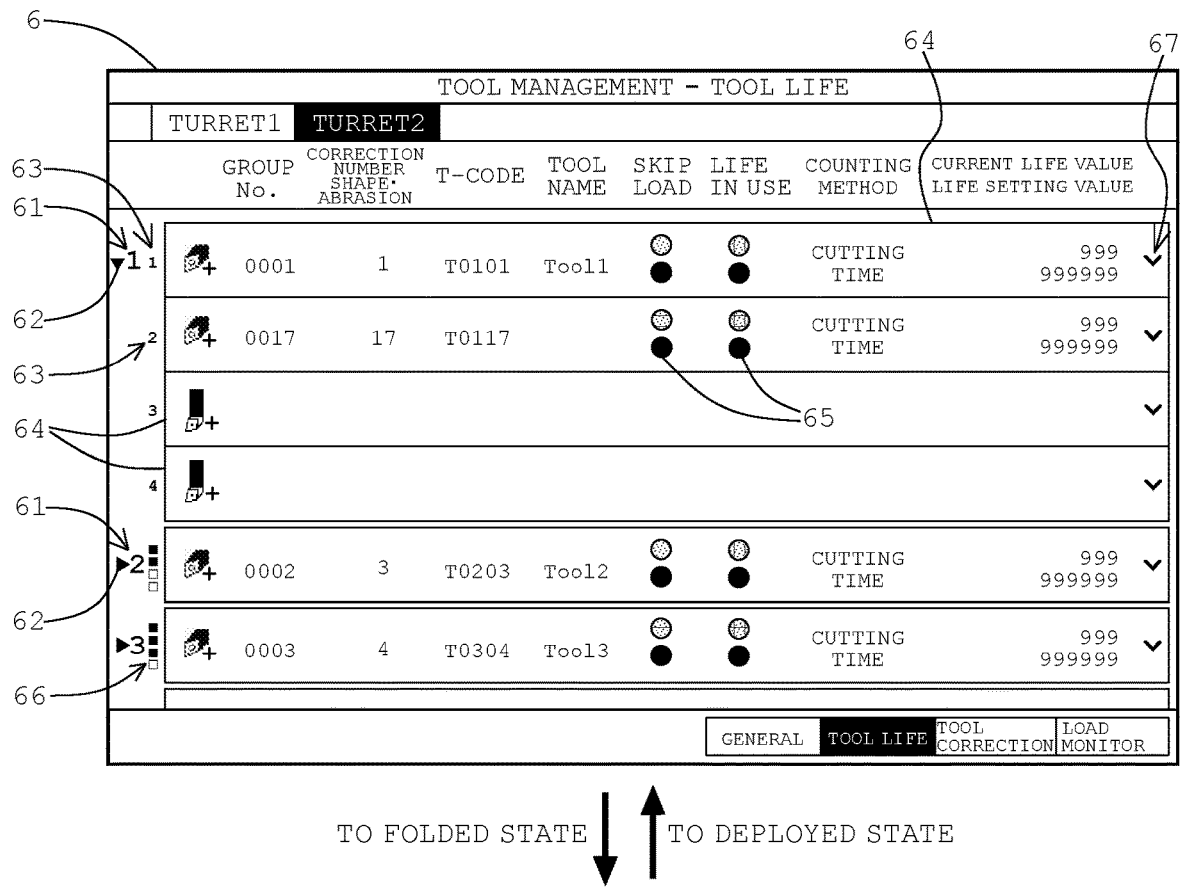
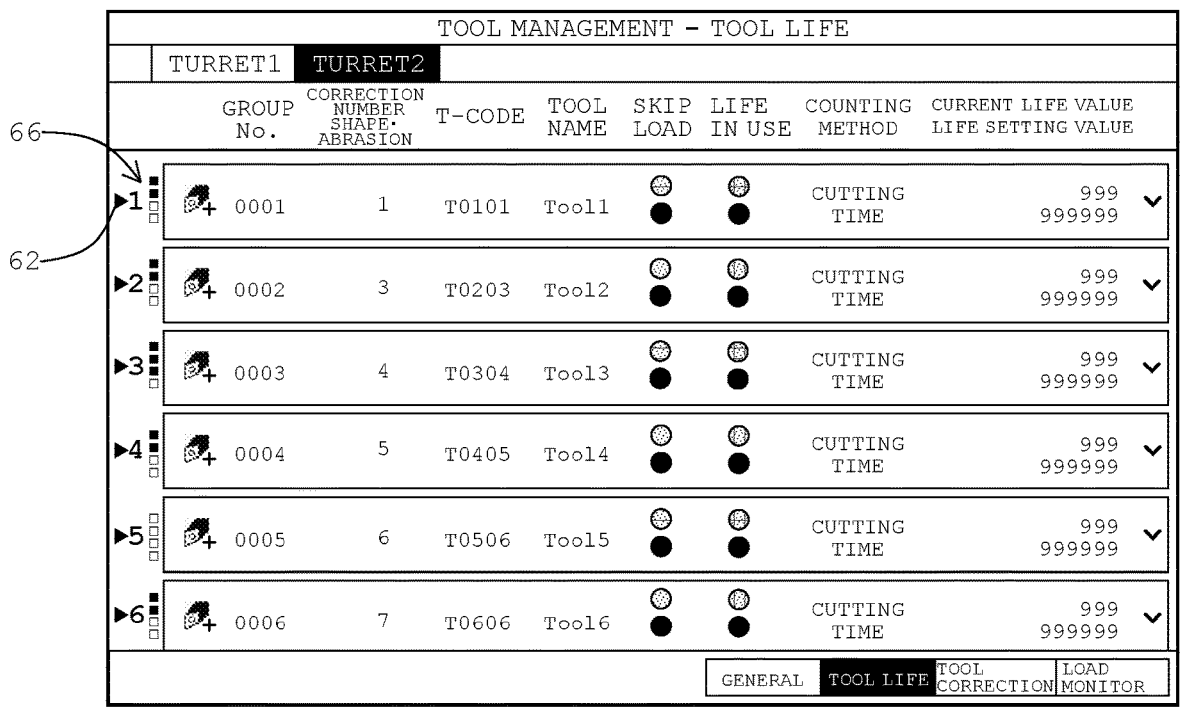

[FIG. 7]
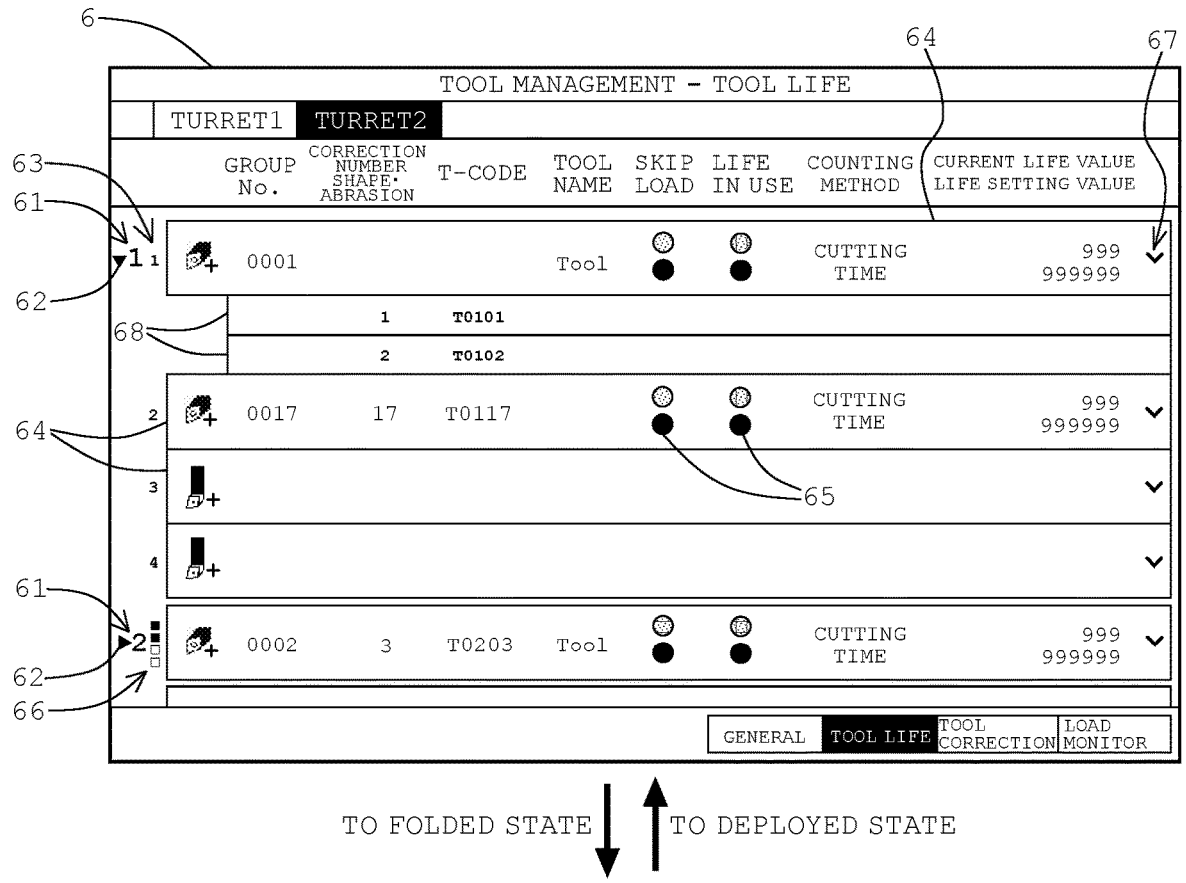
TO FOLDED STATE ↓  ↑ TO DEPLOYED STATE
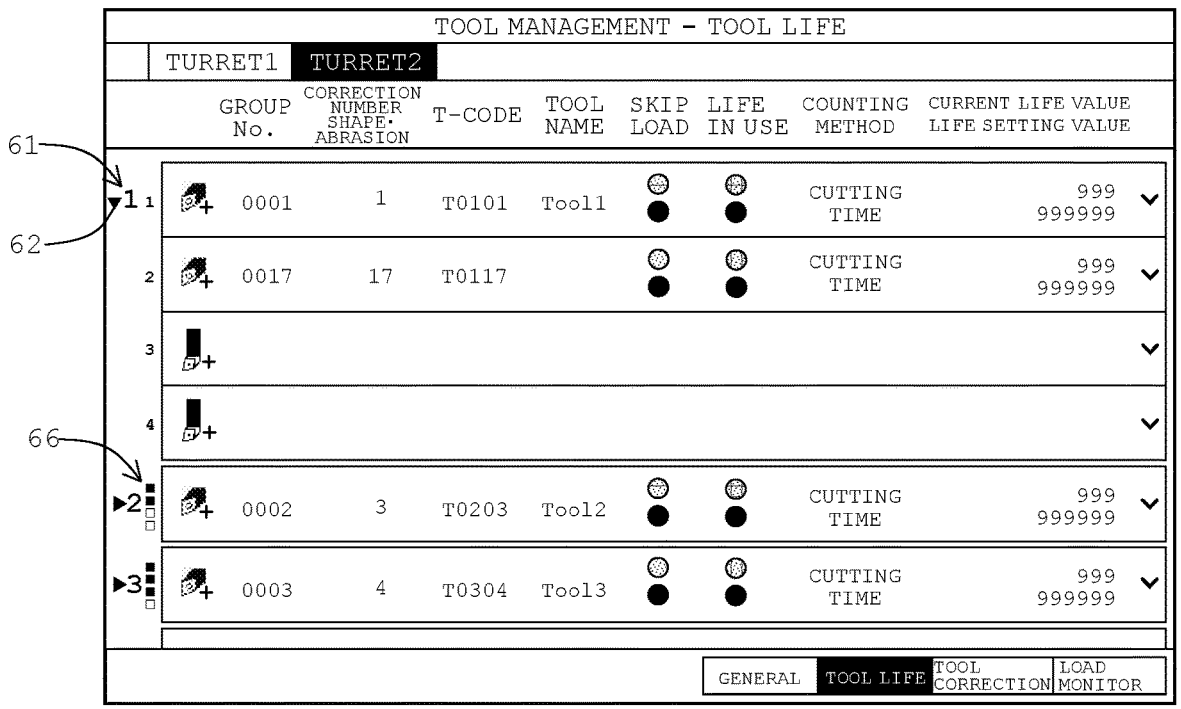

[FIG. 8]
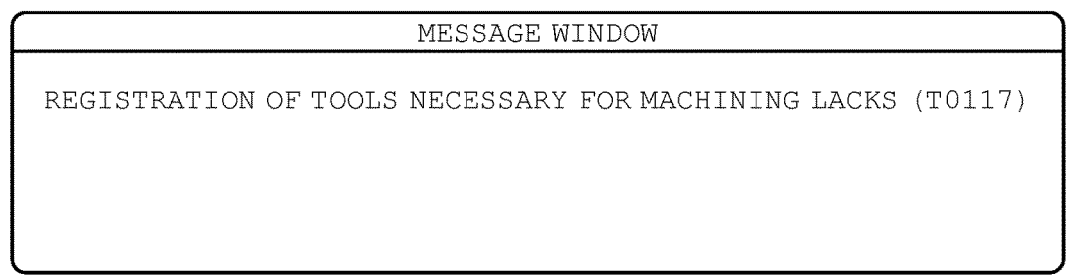

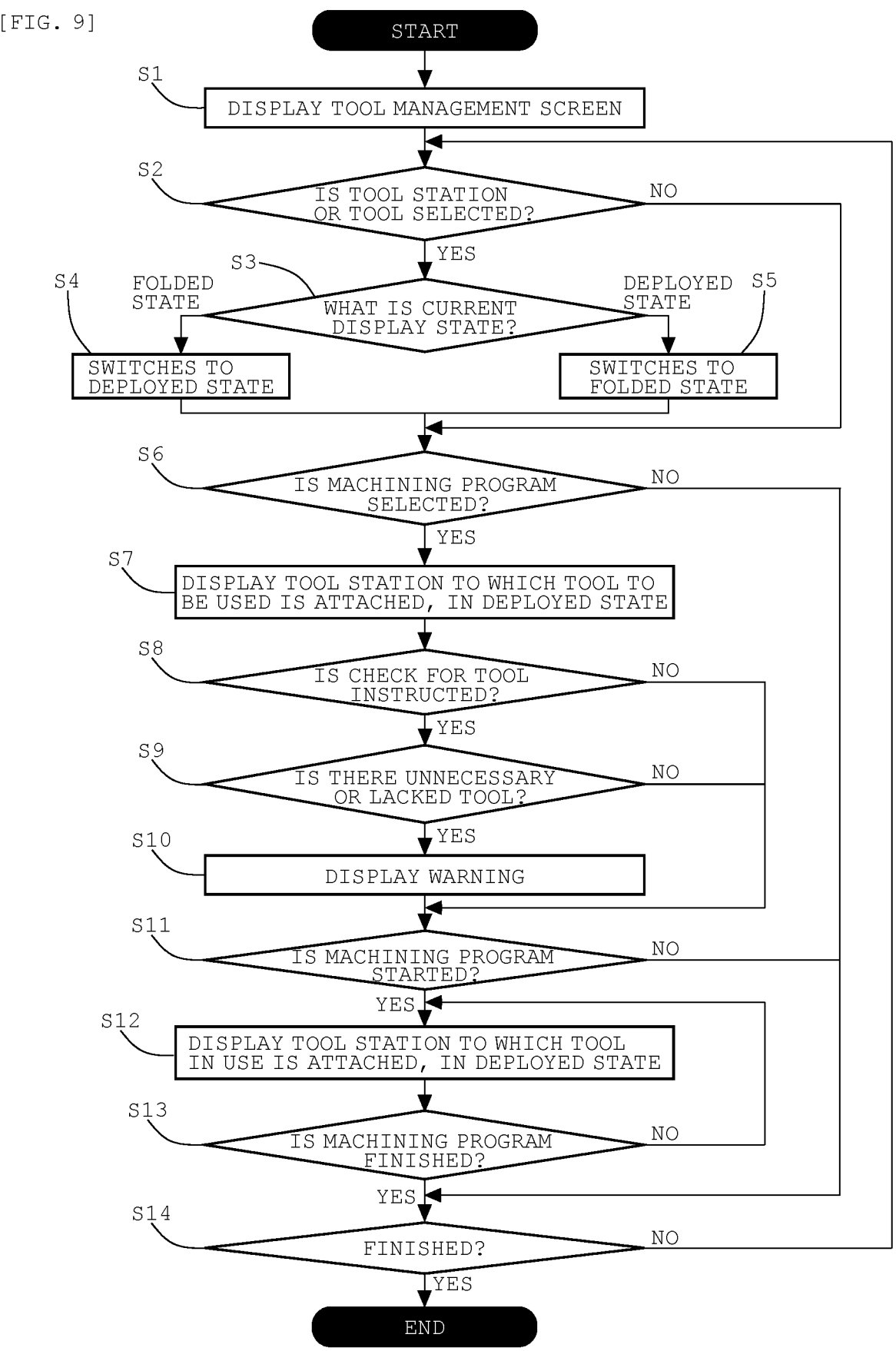

MACHINE TOOL AND MACHINE TOOL MANAGEMENT DEVICE WITH TOOL STATE DISPLAY

CROSS REFERENCE TO RELATED APPLICATIONS

This application claims priority under 35 USC 119 to Japanese Patent Application No. 2017-153581 filed on Aug. 8, 2017, the entire contents which are incorporated herein by reference.

BACKGROUND OF THE INVENTION

Field of the Invention

The present invention relates to a tool management device for managing tools detachable from a plurality of tool stations provided in a tool rest of a machine tool, and a machine tool provided with the same.

Description of the Related Art

Conventionally, a machine tool is provided with a tool rest to which a plurality of tools is attached and switched according to machining. When the tool rest is a swivel turret, for example, a plurality of tool stations is radially provided to allow one or more tools to be attached to the respective tool stations.

As a technique related to a tool rest such as described above, Japanese Patent No. 3207125 proposes a method for instructing selection of an appropriate tool in a turret including a plurality of turret faces in which at least one turret face allows a plurality of tools to be attached thereto, for example.

Unfortunately, conventional tool management devices for managing tools attached to a tool rest, including the invention disclosed in Japanese Patent No. 3207125, each allow a management screen for tools to display only one tool for each tool station even when a plurality of tools is attached to the tool station. Specifically, only a tool to be used first is displayed before machining, and only a tool currently being used is displayed during machining.

This makes it difficult for a user to check all tools attached to the tool station, so that there is a problem of easily causing an error in tool management such as that a tool necessary for machining is forgotten to be attached, or a tool unnecessary for machining is left attached. In addition, an error in tool management such as described above may cause several problems such as that machining is intermediately stopped, a machining error occurs, and a life management function of a tool does not work.

Even a conventional tool management device is capable of displaying a tool that is not displayed in the management screen described above in a screen completely different from the management screen. Unfortunately, every time when existence or nonexistence of a necessary tool, or a state thereof is checked, a screen has to be changed every time. This causes problems such as complication and poor usability.

The present invention is made to solve the problems described above, and an object thereof is to provide a tool management device and a machine tool provided with the same, capable of simply and selectively checking all tools attached to respective tool stations to be able to prevent a necessary tool from being forgotten to be attached and an unnecessary tool from being left attached.

SUMMARY OF THE INVENTION

A tool management device according to the present invention is capable of simply and selectively checking all tools attached to respective tool stations to manage tools detachable from a plurality of tool stations provided in a tool rest of a machine tool to solve problems such as that a necessary tool is forgotten to be attached and an unnecessary tool is left attached. The tool management device includes a display controller controlling a display to display tool information related to one or more tools attached to each of the plurality of tool stations. The display controller switches, on a single screen, between a deployed state of deploying and displaying tool information related to all tools attached to one of the plurality of tool stations, and a folded state of folding and displaying tool information related to only one predetermined tool among the all tools attached to the one of the plurality of tool stations.

As an aspect of the present invention, to visually identify existence or nonexistence, or life of tools attached for a tool station displayed in the folded state and to solve a problem of reducing errors in tool management while a display space in a tool management screen is effectively used, the display controller may control the display to display all tools attached to the tool station in association with a tool station displayed in the folded state.

In addition, as another aspect of the present invention, to solve a problem of efficiently checking a tool necessary for a machining program or a tool being used in machining, when a machining program for controlling the machine tool is selected, the display controller may control the display to display a tool station to which a tool designated by the machining program is attached in the deployed state, and a tool station to which a tool being used in machining is attached in the deployed state when the machining program is executed.

Further, as yet another aspect of the present invention, to solve a problem of allowing a user to reliably recognize a necessary tool forgotten to be attached and an unnecessary tool left to be detached, the display controller compares all tools designated by a machining program for controlling the machine tool with all tools attached to the tool station, and may control the display to display a warning when a tool necessary for the machining program is not attached to the tool station, and/or when a tool unnecessary for the machining program is attached to the tool station.

Furthermore, as yet another aspect of the present invention, to solve problems such as that all cutting edges attached to respective tools can be simply and selectively checked, and that a necessary cutting edge forgotten to be attached, and an unnecessary cutting edge left to be detached, are prevented, the tool information is associated with cutting edge information related to one or more cutting edges attached to the respective tools, and every time when a display area for designating an appropriate tool is selected, the display controller may switch between a deployed state of deploying and displaying cutting edge cutting edge information related to all cutting edges attached to the selected tool, and a folded state of folding and displaying only cutting edge information related to a predetermined cutting edge, to control the display to display the selected state in an identical screen.

A machine tool according to the present invention includes the tool management device of any one of the aspects described above.

According to the present invention, all tools attached to respective tool stations can be simply and selectively checked to be able to prevent a necessary tool from being forgotten to be attached and an unnecessary tool from being left attached.

BRIEF DESCRIPTION OF THE DRAWINGS

FIG. 1 a block diagram illustrating an embodiment of a tool management device and a machine tool, according to the present invention;

FIG. 2 illustrates an example of data on a tool rest stored in a table data storage unit of the present embodiment;

FIG. 3 illustrates an example of data on tools stored in the table data storage unit of the present embodiment;

FIG. 4 illustrates an example of data on cutting edges stored in the table data storage unit of the present embodiment;

FIG. 5 illustrates an example of data on correction values stored in the table data storage unit of the present embodiment;

FIG. 6 illustrates an example of a tool management screen in the present embodiment when a tool station "1" is switched between a deployed state and a folded state, and is displayed;

FIG. 7 illustrates an example of the tool management screen in the present embodiment when a tool at an attached position number "1" in the tool station "1" is switched between the deployed state and the folded state, and is displayed;

FIG. 8 illustrates an example of a warning displayed in display means in the present embodiment; and FIG. 9 is a flowchart illustrating processing by the tool management device of the present embodiment.

DETAILED DESCRIPTION OF THE PREFERRED EMBODIMENTS

Hereinafter, an embodiment of a tool management device and a machine tool provided with the same, according to the present invention, will be described with reference to accompanying drawings.

As illustrated in FIG. 1, a tool management device 1 of the present embodiment is connected to a machine tool 11 controlled by a numerical control device 10, and is configured to manage tools 13 detachable from a plurality of tool station 121 provided in a tool rest 12 of the machine tool 11. Each configuration will be described below in detail.

The machine tool 11 applies machining such as turning to a work, like a lathe turning machine of a machine tool, a combined machine having a turning function and a milling function, and a turning center, for example. In the present embodiment, the machine tool 11 is configured to be able to be controlled by computer numerical control (CNC) with the numerical control device 10, and includes the tool rest 12 for attaching the tools 13 to be used for machining.

The tool rest 12 is a base for attaching the tools 13 when the machine tool 11 applies machining to a work. In the present embodiment, the tool rest 12 is formed of a turret radially provided with a plurality of tool stations 121, as illustrated in FIG. 1. Each of the tool stations 121 is formed such that each of the plurality of tools 13 is detachable using a holder (not illustrated). The turret turns in response to a driving signal supplied from the numerical control device 10 to select an appropriate tool 13.

In the present embodiment, the machine tool 11 is configured to detect an ID (tool management number) for identifying the additional tool 13 and an attached position thereof (a station number and an attached position number) when an additional tool 13 is attached to the tool rest 12, and to notify them to the tool management device 1. The machine tool 11 is also configured such that when a tool 13 is detached from the tool rest 12, an attached position (a station number and a holder attached position) of the tool 13 is notified to the tool management device 1.

While the machine tool 11 provided with one tool rest 12 is described in the present embodiment, the present invention is not limited to this configuration, and is also applicable to a machine tool 11 provided with a plurality of tool rests 12. In addition, while a turret is used as the tool rest 12 in the present embodiment, the tool rest 12 is not limited to this, and any base for attaching tools 13 may be available. For example, the present invention is also applicable to a tool rest 12 of a quadrangular tool rest, a comb-shaped tool rest, or a rotating tool rest.

The tool management device 1 is formed of a computer such as a personal computer, a tablet terminal, a smartphone, or the like, and mainly includes input means 2 for receiving input from a user, display means 3 for displaying a tool management screen 6 described below and the like, storage means 4 for storing a tool management program 1a of the present embodiment and various data, and control means 5 for performing various calculation processes, serving as each component described below, as illustrated in FIG. 1. Each constituting means will be described below in detail.

While the tool management device 1 is composed of hardware separated from the numerical control device 10 and the machine tool 11 in the present embodiment, the present invention is not limited to this configuration. For example, functions of tool management device 1 according to the present invention may be implemented in the numerical control device 10 to be integrated as the tool management device 1, or the functions of the tool management device 1 according to the present invention may be implemented in the machine tool 11 to be integrated as the tool management device 1.

The input means 2 is configured to receive input of data and information from a user. In the present embodiment, the input means 2 is configured to output positional information designated by a user in the tool management screen 6 described below used to manage the tools 13, data received from the user, and the like, to the control means 5.

The display means 3 is configured to show display contents received from a display control unit 51 described below. In the present embodiment, the display means 3 is configured to show the tool management screen 6 illustrated in FIG. 6, a machining program being selected or executed, a warning described below, and the like.

In the present embodiment, the input means 2 and the display means 3 are formed as a touch panel including not only a position input function with a touch pad or the like as the input means 2, but also a display function with a liquid crystal display or the like as the display means 3. Then, various data and information items are to be delivered to the control means 5 in accordance with a touch position in the touch panel. A type of the touch panel is not limited, and a touch panel capable of inputting data in accordance with a touch position, such as a capacitance type, a resistive film type, or a surface acoustic wave type, is available.

The input means 2 and the display means 3 are not limited to a touch panel. The input means 2 composed of a pointing device such as a mouse, and the display means 3 composed of a display device such as a liquid crystal monitor, may be provided as respective separated devices. In this case, a mouse pointer is shown in the display means 3, so that various data and information items are provided to the control means 5 in accordance with a position of the mouse pointer when left click or the like is pressed.

The storage means 4 not only stores various data, but also serves as a working area when the control means 5 performs various calculation processes. In the present embodiment, the storage means 4 is composed of a hard disk, a read only memory (ROM), a random access memory (RAM), a flash memory, or the like, and includes a program storage unit 41, a machining program storage unit 42, a table data storage unit 43, and a GUI data storage unit 44, as illustrated in FIG. 1.

The program storage unit 41 stores a tool management program 1a installed for controlling the tool management device 1 of the present embodiment. When the control means 5 executes the tool management program 1a, a computer as the tool management device 1 serves as each component described below.

A utility form of the tool management program 1a is not limited to the configuration described above. For example, the tool management program 1a may be stored in a computer-readable and non-temporary recording medium, such as a CD-ROM or a USB memory, to be executed by being directly read out from the recording medium. The tool management program 1a may be used by a cloud computing method via an external server or the like, an application service provider (ASP) method, or the like.

The machining program storage unit 42 is configured to store a machining program for controlling drive of the machine tool 11. In the present embodiment, the machining program is described by NC codes for controlling the machine tool 11 with numerical control. The NC codes are formed of character strings consisting of alphabets and numeric values, and mainly include a G code for designating a preparation function for machining, an M-code achieving an auxiliary role of the G-code, a T-code for designating a tool 13 and a correction number, and the like.

The table data storage unit 43 is configured to store table data necessary for managing tools 13. In the present embodiment, table data storage unit 43 stores tool rest data, tool data, cutting edge data, and correction value data, as illustrated in FIG. 1. Each of the data will be described below.

The tool rest data is used for managing all tools 13 attached to the tool rest 12. In the present embodiment, the tool rest data stored includes a station number for identifying a tool station 121, an attached position number for identifying a position of an attached tool 13 in each tool station 121, an attached position valid flag indicating existence or nonexistence ("ON" or "OFF") of a tool 13 at the attached position number, and a tool management number for identifying an attached tool 13, as illustrated in FIG. 2.

The station number has a maximum value coinciding with a total number of the tool stations 121 provided in the tool rest 12, and the attached position number has a maximum value coinciding with the number of tools 13 attachable to one tool station 121. Thus, in any tool station 121, the number of attached position valid flags each indicating "OFF" is to be automatically determined as the number of tools 13 that can be added to the tool stations 121.

In the present embodiment, when a tool 13 is attached to the tool rest 12, a tool management number, a station number, and an attached position number, of the tool 13 are notified to the tool management device 1 from the machine tool 11, as described above. Meanwhile, when a tool 13 is detached form the tool rest 12, a station number and an attached position number of a tool station 121 from which the tool 13 is detached are notified to the tool management device 1 from the machine tool 11. This causes the tool rest data stored in the table data storage unit 43 to be automatically updated according to these notifications.

The tool data is table data for managing tool information related to tools 13. In the present embodiment, main tool data stored includes a group number for grouping tools 13 for each identical tool 13, a current life value indicating a current state of a tool 13, a life setting value indicating life of a tool 13 (upper limit value), and the status of a tool 13, by being associated with a tool management number, as illustrated in FIG. 3. Other than these tool information items, various tool information items (not illustrated) are stored by being associated with respective tool management numbers.

The group number is used to manage life of a tool 13 for each group, and an identical group number is assigned for each identical tool 13. Thus, when a tool 13 designated by a machining program fulfills its life, a tool 13 with the same group number as that of the tool 13 is to be automatically nominated as a spare tool.

The current life value is automatically calculated by a tool life managing unit 56 described below using a life formula in accordance with time used for machining, the number of times used for machining, or the like. The life setting value indicates a life of a tool 13 usable for machining, and is set as an upper limit value of the current life value. As the status, the tool life managing unit 56 sets normal, warning (life is about to be fulfilled), abnormal (life is fulfilled), or the like, in accordance with a current life value with respect to the life setting value. The status is only a guideline, and thus when there is no problem in visual check for damage of a tool 13 by a user, the tool 13 may continue to be used. In this case, the status of the tool 13 returns to normal by manually reducing the current life value or increasing the life setting value.

The cutting edge data is used for managing a cutting edge detachable from a tool 13. In the present embodiment, cutting edge data includes a cutting edge number for identifying a cutting edge attached to the tool 13, a correction number for referring to a correction value, and a T-code, being stored for each tool management number, or for each different tool 13, as illustrated in FIG. 4.

In the present embodiment, the T-code consists of "T" and a four-digit number. First two digits of the number indicate a station number, and last two digits thereof indicate a correction number. Then, every time when an additional tool 13 is registered in the tool rest data, a T-code is automatically given in accordance with a station number of a tool station to which the tool 13 is attached and a correction number.

The present embodiment is configured such that one or more cutting edges are detachably attached to respective tools 13, so that the cutting edge data is used. However, when a tool 13 with a cutting edge being not detachable is only used, cutting edge data is unnecessary, and thus cutting edges may be managed by adding a correction number and a T-code to tool data.

The correction value data is used to manage a correction value (off-set value) based on a shape of a tool 13. In the present embodiment, the correction value data stored includes a correction value consisting of the amount of correction for shape and the amount of correction for abrasion, being associated with a correction number for identifying a correction value, as illustrated in FIG. 5.

The GUI data storage unit 44 is configured to store GUI data for displaying a graphical user interface that enables intuitive operation using the input means 2 in the display means 3. In the present embodiment, the GUI data storage unit 44 stores data for displaying the tool management screen 6 as illustrated in FIG. 6, or the like.

The tool management screen 6 is configured to display tool information related to tools 13 attached to respective tool stations 121 in a tree view. Specifically, a deployed state of deploying and displaying tool information related to all of the tools 13 attached to the respective tool stations 121, and a folded state of folding and displaying tool information related to appropriate tools 13, are to be displayed in an identical screen by being switched, as illustrated in FIG. 6.

In the present embodiment, station numbers 61 corresponding to respective tool stations 121 are each displayed, in bold letters, near a left end portions of the tool management screen 6. On the left of the station number 61, a tool display change icon 62 for instructing switching between the deployed state and the folded state is disposed as a display area 62. Every time when the tool display change icon 62 corresponding to an appropriate tool station 121 is selected with the input means 2, tool information on a tool 13 attached to the selected tool station 121 is displayed in the deployed state or the folded state while being switched.

In the present embodiment, the tool display change icon 62 is displayed with a downward triangle in the deployed state, and with a rightward triangle in the folded state, as illustrated in FIG. 6. However, the display area 62 for designating an appropriate tool station 121 is not limited to the tool display change icon 62, and an appropriate display area 62 may be assigned as appropriate.

When a tool station 121 is displayed in the deployed state in the present embodiment, attached position numbers 63 set for the tool station 121 are displayed downward in order on the right of a station number 61 at the top place, as illustrated in FIG. 6. Then, tool display areas 64 for displaying tool information are displayed in parallel as lower layers while being associated with respective attached position numbers 63.

In the present embodiment, tool information displayed includes a group number, a correction number, a T-code, a tool name, skip (upper row)/load (lower row), a life (upper row)/in use (lower row), a counting method, and a current life value/a life setting value, as illustrated in FIG. 6. Meanwhile, there is displayed a tool display area 64 corresponding to an attached position number 63 of a position at which no tool 13 is attached, while spaces for various tool information items are blank.

In the present embodiment, states of skip/load, and life/in use, are each distinguishable by color of a circular status icon 65, as illustrated in FIG. 6. Examples are as follows:

skip: black indicates OFF (used in machining), and green indicates ON (is not used in machining);

load: black indicates that a load monitor is not used, green indicates that the load monitor is in use, yellow indicates a load warning state, and red indicates an abnormal load state;

life: green indicates a normal state, yellow indicates that a life is about to be fulfilled; and red indicates that a life is fulfilled; and in use: black indicates non-use in machining, and green indicates in-use in machining.

In the present embodiment, the table data storage unit 43 stores the tool information described above as the tool data. Items displayed as the tool information are not limited to the contents described above, and various tool information items necessary for managing tools 13 may be displayed.

Meanwhile, when a tool station 121 is displayed in the folded state, there is only displayed a tool display area 64 related to any one of tools 13 attached to the tool station 121 (e.g., a tool with an attached position number of "1"), as illustrated in FIG. 6. Then, states of all of the tools 13 attached to the tool station 121 are simply displayed near a left end portion of the tool display area 64.

Specifically, small quadrangular and simple display icons 66 are each displayed downward in order from above so as to correspond to an attached position number 63 set to each tool station 121, as illustrated in FIG. 6. Then, existence or nonexistence of a tool 13 at the position of the corresponding attached position number 63, a life of the tool 13, or the like is displayed while being distinguished by color of the simple display icon 66.

For example, each state of a tool 13 can be set as follows while being associated with color of the simple display icon 66:

white indicates that a tool 13 is not registered;

black indicates that a tool 13 is registered;

red indicates that a life of a tool 13 registered is fulfilled; and yellow indicates that a life of a tool 13 registered is about to be fulfilled.

When the simple display icon 66 such as described above is displayed, existence or nonexistence, a life, or the like of a tool 13 attached to a tool station 121 displayed in the folded state can be visually identified at first glance, as with a tool station 121 displayed in the deployed state. This allows the tool management screen 6 to be effectively used, so that more states of the tool station 121 can be grasped without scrolling or the like of the screen.

While a state of a tool 13 is identified by color of the simple display icon 66 in the present embodiment, the present invention is not limited to this configuration. For example, a state of a tool 13 may be identified by causing the simple display icon 66 to be different in shape (circle, triangle, etc.), a blinking state, or the like.

In the present embodiment, the tool management screen 6 has a function of displaying also the cutting edge information related to cutting edges attached to respective tools 13 in a tree view. Specifically, the deployed state of deploying and displaying cutting edge information related to all cutting edges attached to a tool 13, and the folded state of folding and displaying cutting edge information related to only appropriate cutting edges, are to be displayed in an identical screen by being switched, as shown in the tool station 121 of a position number of "1" in FIG. 7.

In the present embodiment, a cutting edge display change icon 67 is disposed in a right end portion of the tool display area 64 of each tool 13, as a display area 67 for instructing switching between the deployed state and the folded state, as illustrated in FIG. 7. Every time when the cutting edge display change icon 67 corresponding to an appropriate tool 13 is selected with the input means 2, cutting edge information on a cutting edge attached to the selected tool 13 is displayed in the deployed state or the folded state while being switched.

In the present embodiment, the cutting edge display change icon 67 is displayed in a substantially V-shape, as illustrated in FIG. 7. However, the display area 67 for designating an appropriate tool 13 is not limited to the cutting edge display change icon 67, and an appropriate display area 67 may be assigned as appropriate.

When a tool 13 is displayed in the deployed state in the present embodiment, cutting edge display areas 68 for displaying cutting edge information are displayed in parallel as lower layers below the tool display area 64 being an upper layer, as shown in the tool station 121 of a position number of "1" in FIG. 7. Each of the cutting edge display areas 68 is displayed while having a left end portion shorter than that of the tool display area 64, so as to be intuitively grasped as a lower layer of the tool 13.

The cutting edge display areas 68 are displayed by the number of cutting edge numbers, together with correction numbers and T-codes, registered as the cutting edge data. As a result, it is recognized that cutting edges each having a different T-code are attached to the same tool 13. When a tool 13 is displayed in the deployed state, a correction number and a T-code are not displayed in the tool display area 64, and spaces therefor are blank.

Meanwhile, when a tool 13 is displayed in the folded state in the present embodiment, the cutting edge display area 68 is not displayed as illustrated in FIG. 7. Alternatively, cutting edge information (a correction number and a T-code) related to any one of cutting edges (e.g., a cutting edge with a cutting edge number of "1") attached to the tool 13 is only displayed in the tool display area 64.

When tools 13 are displayed in the folded state, an icon for simply displaying existence or nonexistence, or the like of a cutting edge may be displayed at an appropriate position in the tool display area 64 so as to correspond to a cutting edge number set to the corresponding one of the tools 13 as with the simple display icon 66 described above. As a result, existence or nonexistence, or the like of a cutting edge attached to each of the tools 13 can be recognized at first glance even for the tools 13 displayed in the folded state. This allows the tool management screen 6 to be effectively used, so that more states of the tool 13 can be grasped without scrolling or the like of the screen.

The control means 5 is composed of a central processing unit (CPU) and the like, and executes the tool management program 1a installed in the storage means 4 to serve as the display control unit 51, a user input detector 52, a display state determining unit 53, an active displaying unit 54, a tool checking unit 55, a tool life managing unit 56, and a correction number editor 57, as illustrated in FIG. 1. Hereinafter, each component will be described in detail.

The display control unit 51 is configured to control display contents of the display means 3. In the present embodiment, the display control unit 51 reads out not only various data from the table data storage unit 43 but also GUI data from the GUI data storage unit 44 when a user calls up the tool management screen 6, and causes the display means 3 to display the tool management screen 6 as described in FIGS. 6 and 7.

In the present embodiment, every time when the display area 62 (tool display change icon) for designating an appropriate tool station 121 is selected in the display means 3 with the input means 2, the display control unit 51 switches a display state of the selected tool station 121 between the deployed state and the folded state in an identical screen, as illustrated in FIG. 6.

Specifically, every time when the tool display change icon 62 is selected, the display control unit 51 causes the display state determining unit 53 to determine a current display state of the selected tool station 121. When the current display state is the folded state, the display control unit 51 acquires tool information on all tools 13 attached to the selected tool station 121 with reference to data in the table data storage unit 43. Then, the display control unit 51 disposes the tool display areas 64 in parallel by the number of attached positions, and causes the tool display area 64 of a tool 13 with an attached position valid flag of "ON" to display the tool information, and the tool display area 64 of a tool 13 with an attached position valid flag of "OFF" to display while leaving it blank.

Meanwhile, when a current display state of the selected tool station 121 is the deployed state, the display control unit 51 acquires tool information on any one of tools 13 attached to the selected tool station 121 with reference to data in the table data storage unit 43. Then, the display control unit 51 causes only one tool display area 64 to be displayed so that the acquired tool information is displayed in the tool display area 64.

In the present embodiment, the display control unit 51 causes states of all the tools 13 attached to the tool station 121 to be simply displayed in association with a tool station 121 displayed in the folded state. Specifically, the display control unit 51 acquires an attached position valid flag of a tool station 121 displayed in the folded state, and a status of each of the attached tools 13, with reference to data in the table data storage unit 43. Then, the display control unit 51 causes the simple display icon 66 to be changed in color and displayed based on the acquired data.

In the present embodiment, every time when the display area 67 (cutting edge display change icon) for designating an appropriate tool 13 is selected in the display means 3 with the input means 2, the display control unit 51 switches a display state of the selected tool 13 between the deployed state and the folded state in an identical screen, as illustrated in FIG. 7.

Specifically, every time when the cutting edge display change icon 67 is selected, the display control unit 51 causes the display state determining unit 53 to determine a current display state of the selected tool 13. When the current display state is the folded state, the display control unit 51 acquires cutting edge information on all cutting edges attached to the selected tool 13 with reference to data in the table data storage unit 43. Then, the display control unit 51 causes cutting edge display areas 68 to be disposed in parallel by the number of cutting edges so that the acquired cutting edge information is displayed in the corresponding one of the cutting edge display areas 68.

Meanwhile, when a current display state of the selected tool 13 is the deployed state, the display control unit 51 acquires cutting edge information on any one of cutting edges attached to the selected tool 13 with reference to data in the table data storage unit 43. Then, the display control unit 51 causes the cutting edge display area 68 not to be displayed so that the acquired cutting edge information is displayed in the selected tool display area 64.

The user input detector 52 detects a selected position in the display means 3, being input by a user with the input means 2. In the present embodiment, the user input detector 52 always monitors a selected position in the tool management screen 6. When a tool display change icon 62 is selected, a station number 61 corresponding to the tool display change icon 62 is detected. In addition, when a cutting edge display change icon 67 is selected, a tool management number corresponding to the cutting edge display change icon 67 is detected.

When a user selects an appropriate machining program, the user input detector 52 detects the selected machining program. In addition, when a tool check button (not illustrated) is selected, the user input detector 52 detects that a tool check described below is instructed.

The display state determining unit 53 determines a current display state of a tool station 121 or a tool 13, selected by a user. In the present embodiment, when the user input detector 52 detects a station number 61 or a tool management number, the display state determining unit 53 determines a current display state (the deployed state or the folded state) of the corresponding tool station 121 or tool 13. For the determination, a display state flag indicating the deployed state or the folded state may be stored in the tool rest data or the tool data so that the display state flag is referred.

The active displaying unit 54 automatically displays a tool 13 necessary for a machining program, or a tool 13 in use in machining, in the tool management screen 6. In the present embodiment, when an appropriate machining program is selected by a user, the active displaying unit 54 extracts all tools 13 designated by T-codes in the machining program with reference to data in the machining program storage unit 42. Then, the active displaying unit 54 instructs the display control unit 51 to cause the tool management screen 6 to display tool stations 121 to which the respective tools 13 are attached in the deployed state as many as possible.

In the present embodiment, when a machining program selected by a user is executed, the active displaying unit 54 always monitors the block in execution. Then, during execution of the machining program, the active displaying unit 54 identifies a tool station 121 to which a tool 13 currently used in the machining is attached with a T-code, and instructs the display control unit 51 to display the tool station 121 in the deployed state.

The active displaying unit 54 may be configured such that after machining with a tool station 121 displayed in the deployed state is finished, the display of the tool station 121 is automatically switched to the folded state. This allows a display space in the tool management screen 6 to be effectively used, so that more tool stations 121 are displayed.

The tool checking unit 55 checks a tool 13 attached to a tool station 121. In the present embodiment, when a user instructs a tool check, the tool checking unit 55 compares all tools 13 designated by a machining program selected at the time with all tools 13 attached to respective tool stations 121. Then, when a tool 13 necessary for the machining program is not attached to the tool station 121, and/or when a tool 13 unnecessary for the machining program is attached to the tool station 121, the tool checking unit 55 instructs the display control unit 51 to cause the display means 3 to display a warning.

Specifically, the tool checking unit 55 extracts a T-code (necessary T-code) included in the selected machining program with reference to data in the machining program storage unit 42. The tool checking unit 55 also acquires a tool 13 currently attached to a tool station 121 or a T-code (current T-code) of a cutting edge of the tool 13 with reference to data in the table data storage unit 43. Then, the tool checking unit 55 checks the tool 13 for a registered state based on deficiency and excess of the current T-code with respect to the necessary T-code.

The display means 3 may display a warning in a message window or the like, indicating that a tool 13 necessary for machining is not attached, as illustrated in FIG. 8. When a tool 13 unnecessary for machining is attached, a warning mark 69 may be displayed at a conspicuous position in a tool display area 64 of the tool 13 as illustrated in FIG. 8, and the simple display icon 66 described above may be displayed so as to be able to identify the tool 13 that is unnecessary. In addition, when a tool station 121 to which the unnecessary tool 13 belongs is displayed in the folded state, a warning may be displayed by switching the folded state to the deployed state.

The tool life managing unit 56 manages a life of a tool 13. In the present embodiment, when detecting that a T-code for designating a tool 13 is instructed in a machining program in execution, the tool life managing unit 56 acquires a time (cutting time) from a time of the detection to finishing of machining with the designated tool 13 from the numerical control device 10. Then, the tool life managing unit 56 calculates a value to be added to a current life value on the basis of the acquired cutting time and a life formula to update the current life value in the table data storage unit 43. For a current life value of a tool 13 to which a plurality of cutting edges is attached, there is displayed a total value acquired by adding current life values of the respective cutting edges.

The tool life managing unit 56 determines a state of the tool 13 from a relationship between the updated current life value and a life setting value to update a status in the tool data in the table data storage unit 43. This enables a life of the tool 13 to be managed with the T-code for designating the tool 13 without using a conventional specific T-code such as T0199 (first two digits indicate a group number). As a result, a management error of the life due to leaving out of a specific T-code is prevented to accurately and reliably manage the life.

In the present embodiment, when detecting that a tool presetter (not illustrated) has measured dimensions of a tool 13, the tool life managing unit 56 resets a current life value of the tool 13 to an initial value. This causes the current life value to be automatically reset at timing when an additional tool 13 is attached to a tool station 121, so that life management is facilitated. While the tool life managing unit 56 calculates a current life value on the basis of a cutting time in the present embodiment, the current life value may be calculated on the basis of a combination of the number of cutting times, cutting conditions, and the like, as appropriate.

The correction number editor 57 edits a correction number set for each tool 13 or cutting edge. In the present embodiment, when a correction number of an appropriate tool 13 is rewritten in the tool management screen 6, for example, the correction number editor 57 updates a correction number in the table data storage unit 43 with the correction number. When a correction value for each tool 13 or cutting edge is managed with a correction number, editing work is facilitated as compared with when a correction value is directly edited by manual work to reduce input errors.

Subsequently, operation of the tool management device 1 and the machine tool 11 provided therewith of the present embodiment will be described.

When tools 13 are managed by using the tool management device 1 of the present embodiment, the various data described above are registered in the table data storage unit 43 as advance preparations. Accordingly, a station number 61 is associated with a tool management number, and the tool management number is associated with a cutting edge number. As a result, data structure of the tool station 121, tool information, and cutting edge information, layered in the order listed above, is formed.

After the registration of the various data, the display control unit 51 causes the display means 3 to display the tool management screen 6 in response to an input instruction from a user, as illustrated in FIG. 9 (step S1). This causes the display means 3 to display tool information on tools 13 attached to respective tool stations 121, and cutting edge information on cutting edges attached to the respective tools 13, as illustrated in FIGS. 6 and 7.

Next, the user input detector 52 determines whether a tool station 121 or a tool 13 is selected, on the basis of a user's touch position in the tool management screen 6 (step S2). As a result of the determination, when the touch position is not at a tool display change icon 62 or a cutting edge display change icon 67, it is determined that a tool station 121 or a tool 13 is not selected (NO at step S2), and then processing proceeds to step S6 described below.

Meanwhile, when the user input detector 52 determines that a tool station 121 or a tool 13 is selected (YES at step S2), the display state determining unit 53 determines a current display state for the selected tool station 121 or tool 13 (step S3). As a result of the determination, when the selected tool station 121 or tool 13 is displayed in the folded state (folded state at step S3), the display control unit 51 causes the tool station 121 or tool 13 to be displayed by switching the display state to the deployed state (step S4).

This causes tool information related to all tools 13 attached to the tool station 121 manually selected to be displayed in a list in a tree view in an identical screen. As a result, a state of tools 13 in an appropriate tool station 121 is simply and selectively checked without changing the tool management screen 6 to another screen. Thus, errors such as a necessary tool 13 forgotten to be attached and an unnecessary tool 13 left to be detached tend to be easily found out, so that a stop of machining, a machining error, malfunction of a tool life management function, and the like, due to the error, are prevented from occurring.

Likewise, cutting edge information related to all cutting edges attached to the tool 13 manually selected is displayed in a list in a tree view in an identical screen. As a result, a state of cutting edges in an appropriate tool 13 is simply and selectively checked without changing the tool management screen 6 to another screen. This reduces errors such as a necessary cutting edge forgotten to be attached and an unnecessary cutting edge left to be detached.

Meanwhile, as a result of the determination at step S3, when a display state of the selected tool station 121 or tool 13 is the deployed state (deployed state at step S3), the display control unit 51 causes the tool station 121 or tool 13 to be displayed by switching the display state to the folded state (step S5), as illustrated in FIGS. 6 and 7.

Accordingly, a tool station 121 or tool 13 unnecessary to be checked is simply and selectively displayed in the folded state. As a result, a display space in the tool management screen 6 is not wastefully occupied by unnecessary tool information and cutting edge information, so that another tool information and cutting edge information are displayed more. In addition, when tool information and cutting edge information, to be checked, are displayed, a manipulated variable of scrolling necessary in the tool management screen 6 is reduced.

For a tool station 121 to be displayed in the folded state in the present embodiment, the display control unit 51 causes states of all tools 13 attached to the tool station 121 to be simply displayed with simple display icons 66. As a result, even when a tool station 121 is displayed in the folded state, minimum necessary states such as existence or nonexistence, a life, and the like of each of attached tools 13 are grasped to reduce errors in tool management.

Next, the user input detector 52 determines whether a machining program is selected on the basis of user's input operation (step S6). As a result of the determination, when a machining program is not selected (NO at step S6), the processing proceeds to step S14 described below.

Meanwhile, as a result of the determination at step S6, when an appropriate machining program is selected (YES at step S6), the active displaying unit 54 displays a tool station 121 to which a tool 13 to be used in the machining program is attached, in the deployed state (step S7). Accordingly, a state of a tool 13 to be used is easily grasped before execution of the machining program, so that the tool 13 is efficiently checked.

Subsequently, the user input detector 52 determines whether a check for a tool is instructed on the basis of user's input operation tool (step S8). As a result of the determination, when the check for a tool is instructed (YES at step S8), the tool checking unit 55 checks whether there is an unnecessary or lacked tool 13 by comparing all tools 13 to be used in the machining program with all tools 13 attached to the tool station 121 (step S9).

As a result of the check, when the tool 13 to be used in the machining program is not attached to the tool station 121, and/or when a tool 13 not to be used in the machining program is attached to the tool station 121 (YES at step S9), the tool checking unit 55 causes the display means 3 to display a warning (step S10). This causes a user to reliably recognize a necessary tool 13 forgotten to be attached and unnecessary tool 13 left to be detached, so that reliability of tool management is improved.

Subsequently, the active displaying unit 54 determines whether execution of the machining program selected at step S6 is started (step S11). When a check for a tool is not instructed at step S8 described above (NO at step S8), and when there is no unnecessary or lacked tool 13 as a result of the check for a tool at step S9 (NO at step S9), the processing also proceeds to this step S11.

As a result of the determination at step S11, when the execution of the machining program is not started (NO at step S11), the processing proceeds to step S14 described below. Meanwhile, when the execution of the machining program is started (YES at step S11), the active displaying unit 54 displays the tool station 121 to which the tool 13 is attached in the deployed state every time when a tool 13 to be used is changed by a command of the machining program (step S12). Then, unless the machining program finishes (NO at step S13), the processing at step S12 is repeated. This causes a tool 13 in use to be automatically displayed in the tool management screen 6 during the execution of the machining program, so that the tool 13 is efficiently checked.

After that, when the machining program finishes (YES at step S13), the processing retunes to step S2 unless tool management screen 6 is closed (NO at step S14), and then the processing from step S2 to step S13, described above, is repeated.

The present embodiment as described above achieves the following effects.

1. All tools 13 attached to each tool station 121 can be simply and selectively checked to be able to prevent a necessary tool 13 from being forgotten to be attached and an unnecessary tool 13 from being left attached.

2. Errors in tool management are reduced to enable problems such as a stop in the middle of machining, occurrence of machining errors, and malfunction of a tool life management function to be prevented.

3. For even a tool station 121 displayed in the folded state, existence or nonexistence, or a life, of an attached tool 13 is visually checked to enable errors in tool management to be reduced while a display space in the tool management screen 6 is effectively used.

4. A tool 13 necessary for a machining program and a tool 13 in use in machining can be efficiently checked.

5. A user can reliably recognize a necessary tool 13 forgotten to be attached, and an unnecessary tool 13 left to be detached.

6. All cutting edges attached to each tool 13 can be simply and selectively checked to be able to prevent a necessary cutting edge from being forgotten to be attached and an unnecessary cutting edge from being left attached.

7. A tool station 121, tool information, and cutting edge information are displayed with a hierarchical structure in a tree view so that a graphical user interface liable to be instinctively grasped can be provided.

8. Editing work of a correction value can be facilitated by assigning and managing a correction number associated with the correction value without directly inputting a correction value for each tool 13 or cutting edge, so that input errors can be reduced.

9. Only a T-code designating a tool 13 enables a life management function to be performed, so that conventional specific T-codes do not need to be used properly to facilitate creation of a machining program.

The tool management device 1 according to the present invention is not limited to the embodiment described above, and can be modified as appropriate.

For example, in the present embodiment described above, various data in the table data storage unit 43 are automatically updated on the basis of a notification received from the machine tool 11 when a tool 13 is attached or detached. However, the present invention is not limited to this configuration, and various data may be manually updated every time when a tool 13 is attached or detached.

What is claimed is:

1. A tool management device for managing tools detachable from a plurality of tool stations provided in a turret of a machine tool, the tool management device comprising:
a display controller controlling a display to display tool information related to one or more tools attached to each of the plurality of tool stations,
and to switch, on a single screen, between a deployed state of deploying and displaying tool information related to all tools attached to a predetermined tool station, and a folded state of folding and displaying tool information related to only one predetermined tool among the all tools attached to the predetermined tool station,
wherein the display controller controls, in the folded state, the display to display, with display icons, states of all tools attached to the predetermined tool station.

2. The tool management device according to claim 1, wherein when a machining program for controlling the machine tool is selected, the display controller controls the display to display a tool station to which a tool designated by the machining program is attached in the deployed state, and a tool station to which a tool being used in machining is attached in the deployed state when the machining program is executed.

3. The tool management device according to claim 1, wherein the display controller compares all tools designated by a machining program for controlling the machine tool with all the tools attached to the predetermined tool station, and controls the display to display a warning when a tool necessary for the machining program is not attached to the predetermined tool station, and/or when a tool unnecessary for the machining program is attached to the predetermined tool station.

4. The tool management device according to claim 1, wherein the tool information is associated with cutting edge information related to one or more cutting edges attached the respective tools, and every time when a display area for designating an appropriate tool is selected, the display controller switches between a deployed state of deploying and displaying cutting edge information related to all cutting edges attached to the selected tool, and a folded state of folding and displaying only cutting edge information related to a predetermined cutting edge, to control the display to display the selected state in an identical screen.

5. A machine tool comprising the tool management device according to claim 1.

6. The tool management device according to claim 1, wherein the turret holds the tools in the plurality of tool stations and changes a position of the plurality of tool stations so as to use a tool attached to one of the plurality of tool stations for machining.

7. The tool management device according to claim 1, wherein a turret controller rotates the turret to move the predetermined tool station to a predetermined position where the predetermined tool can be changed.

* * * * *